Feb. 18, 1969　　　H. WESSNER　　　3,428,394

EXPOSURE METER FOR MOTION PICTURE CAMERAS

Filed Sept. 23, 1966

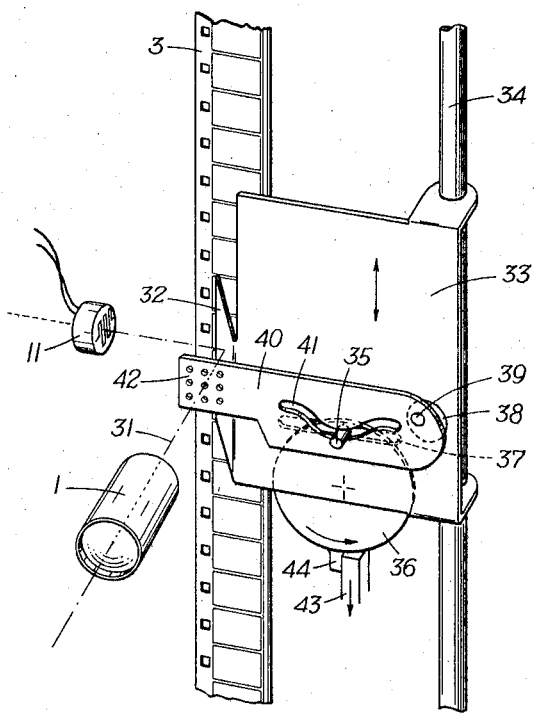

United States Patent Office 3,428,394
Patented Feb. 18, 1969

3,428,394
EXPOSURE METER FOR MOTION PICTURE CAMERAS
Harald Wessner, Vienna, Austria, assignor to Karl Vockenhuber and Raimund Hauser, both of Vienna, Austria
Filed Sept. 23, 1966, Ser. No. 581,595
Claims priority, application Austria, Sept. 24, 1965, A 8,697/65
U.S. Cl. 352—166     11 Claims
Int. Cl. G03b 1/04, 19/18

This invention relates to an exposure meter for motion picture cameras, comprising a reflex shutter which is disposed within the path of rays from the lens and which covers the exposure gate during the pull-down movement of the film and during this time deflects the incident light from the lens to a photoelectric cell, particularly a photoconductor, and a light dimmer, such as a diaphragm or filter, which during the standstill of the shutter reduces the luminous flux which falls on the photoelectric cell to the average value of the luminous flux which is effective during the operation of the shutter.

Such devices are already known. It has been suggested to provide the reflex shutter with a printed line screen or with a grain structure or a mat surface in the area which faces the lens opening in the standstill position. Owing to this arrangement, the luminous flux has the same average value whether the shutter is stationary or moving. In these arrangements it is relatively difficult to maintain the required reduction of the reflection factor with the required accuracy. Where oscillating shutters are used, the difficulty arises that the movement of the shutter is much smaller than with rotary shutters so that the area in which the reflection factor of the reflecting surface is reduced is relatively large relative to the entire reflecting surface. This results in a low average luminous flux and a relatively low sensitivity of the exposure control.

Another known arrangement comprises a gray filter, which is controlled by the release member of the camera and is withdrawn from the path of rays when the shutter is moving. This proposal involves a relatively high mechanical expenditure and is applicable only in very few cases owing to its space requirement.

The disadvantages of the known structures are avoided according to the invention in that the diaphragm or filter for dimming the light is spaced from the reflecting area of the reflex shutter and is driven in synchronism with the reflex shutter and with a phase displacement relative thereto and is disposed in the path of rays when at a standstill.

A particularly simple structure will be obtained according to a further feature of the invention if the light dimmer is driven by the pull-down mechanism and is preferably rigidly connected to the pull-down claw.

Further features of the invention will become apparent from the following description of two illustrative embodiments and with reference to the drawings.

FIG. 5 shows a further embodiment in a perspective view.

Figure 3:
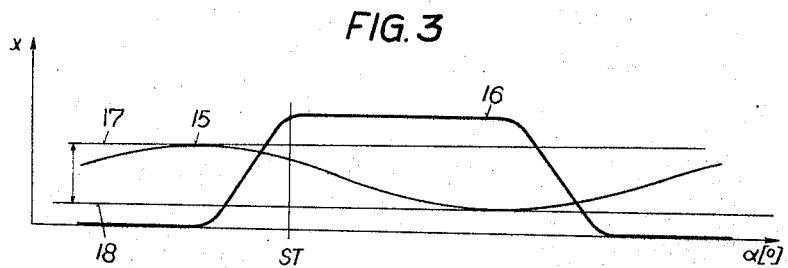
FIG. 3 is a graph illustrating the motion of the pull-down claw and the oscillating shutter.

The drawing shows diagrammatically a camera lens 1, which produces a real image of the object on the film 3 at the exposure gate 2. The film is intermittently fed by a pull-down claw 4, which is controlled by a crank 5 mounted on a shaft 6. The pull-down claw constitutes a pawl, which falls under the action of a spring into the perforation holes of the film and is lifted from the perforation during its upward movement by the inclined face of the claw. During the pull-down movement of the film, the shutter blade 7 covers the exposure gate 2. The shutter blade 7 is driven by a cam 8, which is arranged on the shaft 6. The frame 9, which carries the pull-down claw, and the shutter blade 7 are slidably mounted on a stationary rod 10. The shutter blade 7 has a reflecting coating on its side facing the lens 1 and during the pull-down movement of the film deflects the incident light from the lens to a photoconductor 11, which is in circuit with a battery 12 and a galvanometer 13. One arm of the pull-down frame 9 is provided with a diaphragm 14 provided with a multiplicity of pinholes. This diaphragm is periodically moved into the path of rays between the reflex shutter 7 and the photoconductor 11. FIG. 3 is a graph which represents the motion of the pull-down claw and the oscillating shutter. The angular movement of the shaft 6 is plotted in the direction of the horizontal axis and the displacements are plotted in the vertical direction. The sinusoidal curve 15 represents the movement of the pull-down claw 4 and of the multiple pinhole diaphragm 14. Curve 16 represents the motion function of the shutter blade 7. Two horizontal straight lines 17 and 18 represent the height of the exposure gate. During standstill, the shaft 6 is located in an exactly defined position by a slidable stop 19, which cooperates with a stop 20 on the shaft 6. In this position, which is indicated at ST in FIG. 3, the pull-down claw is close to its upper dead center and the multiple pinhole diaphragm 14 is at a standstill in front of the photoconductor 11 and reduces the light which falls into the photoconductor to a value which corresponds to the average value of the luminous flux falling on the photoelectric cell during a complete rotation of the shaft 6. As a result, the galvanometer 13 gives during standstill the same reading as when the camera is moving. When the control has been rendered operative, the pull-down claw and the multiple pinhole diaphragm 14 descend so that the diaphragm 14 is withdrawn from the photoelectric cell 11. As the shutter 7 initially covers the exposure gate 2, the light which is incident from the lens is entirely deflected to the photoelectric cell. When the pull-down movement has been completed, the pull-down claw returns to its upper end position. At the same time, the shutter blade 7 is withdrawn from the exposure gate 2 so that the film is exposed. No light falls on the photoelectric cell 11 during this phase. As a result, a pulsating direct current flows in the circuit of the galvanometer 13 while the shutter is moving. Only the average value of this current is indicated owning to the inertia and damping of the measuring system.

Figure 1:
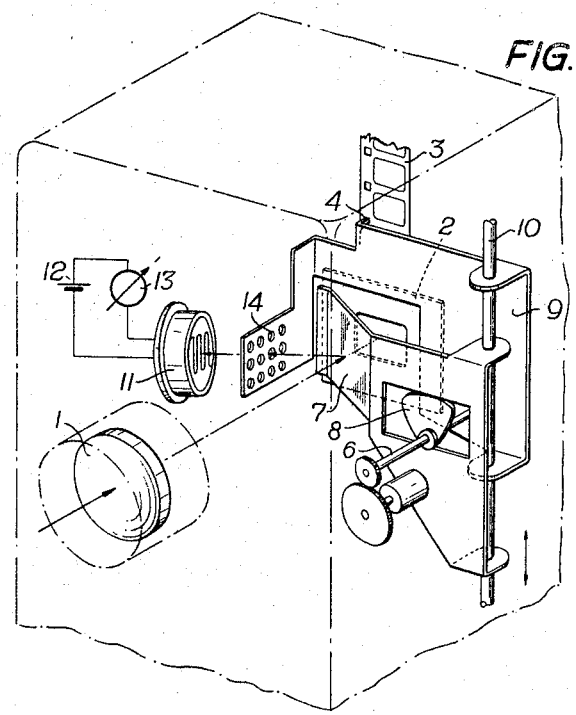
FIG. 1 is a perspective view showing the lens, the oscillating shutter, the pull-down claw and the exposure meter.
Figure 2:
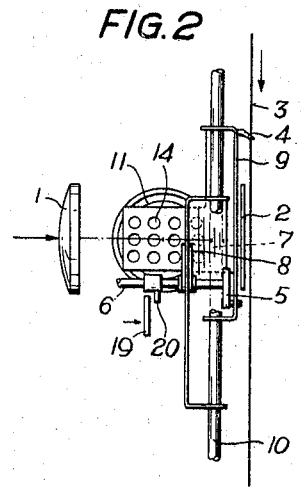
FIG. 2 shows the same arrangement in side elevation.
Figure 4:
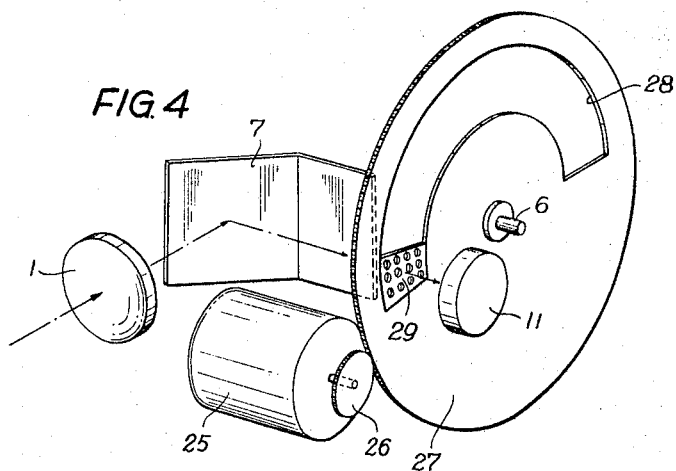
FIG. 4 shows also in a perspective view the basic design of another embodiment.

FIG. 4 shows another embodiment of the invention. Those parts which agree with those shown in FIGS. 1 and 2 are provided with the same reference characters. A pinion 26 is mounted on the shaft of the camera motor 25 and drives a gear 27, which has an opening 28 in the form of an arc of a circle over an angle of approximately 180°. A multiple pinhole diaphragm 29 is provided at one end of this opening. The gear 27 is coupled by means which are not shown to the shutter blade 7 and the pull-down claw 4 to drive the same.

This arrangement has substantially the following mode of operation:

During the pull-down movement of the film, the light which is incident from the lens is deflected by the reflex shutter 7 and falls through the arcuate aperture 28 of the gear 27 onto the photoconductor 11. The photoconductor 11 is covered by the gear 27 during the exposure of the film. When the apparatus is stopped, the shaft 6 is held by a locking device in a position in which the multiple pinhole diaphragm 29 is disposed between the reflex shutter 7 and the photoelectric cell 11, as in FIGS. 1 and 2. This locking device is not shown. The transmission factor of the multiple pinhole diaphragm is again selected so that the luminous flux which falls on the photoelectric cell 11 at a standstill is equal to the average value of the luminous flux during complete rotation of the shaft 6.

In FIG. 5 a further embodiment is shown, in which the camera lens is likewise marked with 1, which latter sharply defines the object on the film 3. The film 3 is gradually advanced by means of a pull-down claw device, which is not subject of the invention and which therefore is not illustrated. During the pull-down movement of the film a mirror 32, declined to the optical axis 31 by 45°, covers the non-illustrated exposure gate and thus prevents an exposure of the film. The mirror 32 forms part of a plate bar 33, which is slidably arranged in vertical sense on a column support 34. The plate bar 33 is driven by a crankpin 35 which is fastened on the disk 36 and which engages with a longhole 37 of the plate bar 33. The plate bar 33 bears a disk 38 which carries an eccentrically arranged pin 39. A sheet bar 40 is pivotally arranged on this pin showing a curved central slot 41, the crankpin engages with. The sheet bar 40 is perforated like a sieve on its free end 42 and immerses in the path of rays of the lens in the indicated position.

The mode of operation of the new arrangement is on principle as follows:

It is attained by the mirror 32 that during the pull-down movement of the film the light incident through the lens 1 is guided to the photoresistor 11 which is situated in the circuit of a semiautomatic or fully automatic diaphragm control. The multiple pinhole diaphragm 42 has the function to compensate the difference in the indication of the diaphragm control, which results from the mirror 32, which with stillstanding shutter guides the whole incident light to the photoresistor, whereas with switched-on camera drive this mirror immerses only for a relatively short time in the path of rays and thus on an average only slightly illuminates the photoresistor 11. The multiple pinhole diaphragm 42 consequently has the function to reduce the luminous flux striking the photoresistor with stillstanding shutter. The control slot 41 is however constructed in a way that the multiple pinhole diaphragm 42 immerses in the path of rays in a shortest possible lapse of time. With stillstanding camera drive the shutter and the multiple pinhole diaphragm are taking an exactly defined position, which is obtained by the cooperation of a movable stop 43 and a stop 44 arranged on the disk 36. The multiple pinhole diaphragm 42 not completely immerses in this position in the path of rays of the lens, but leaves a small strip of the incident pencil of rays uninfluenced. By changing the depth of immersion of the multiple pinhole diaphragm 42, the weakening rate of the light incident on the photoresistor 11 at standstill can consequently be adjusted. The depth of immersion of the multiple pinhole diaphragm may be adjusted by displacing the pin 39 on the plate bar 33. For this purpose the pin is arranged on the eccentric disk 38 which is distorted by adjusting the diaphragm control and subsequently fixed in its position.

The invention is not restricted to the embodiments shown by way of example. For instance, the light dimmer may be operated by a separate cam or crank mechanism. The invention may also be applied to fully automatic diaphragm control systems, in which the galvanometer 13 adjusts the diaphragm aperture. Within the scope of the invention, the photoconductor may be replaced by photosemiconductors, such as photodiodes and phototransistors. It is also possible to use selenium cells. In this case it may be desirable to use amplifiers in circuit with these cells. The multiple pinhole diaphragm shown in the drawing may be replaced by a gray filter or a polarizing filter.

What is claimed is:

1. In a motion picture camera, in combination, a pull-down mechanism for intermittently moving a film along a predetermined path, an optical system including a lens for producing a real image on a portion of said film in said path, means defining an exposure gate in the path of rays from said lens to said portion of said film, a photoelectric cell, a shutter which is adapted to shield said exposure gate from light from said lens and operable to open said exposure gate to light from said lens, said shutter having a reflecting surface which faces said lens and is arranged to deflect light from said lens onto said photoelectric cell when said shutter covers said exposure gate, means for operating said shutter during standstill periods of said pull-down mechanism and to hold said shutter at a standstill in the position in which it covers said exposure gate during the operation of said pull-down mechanism, a light dimmer which is spaced from said reflecting surface and movable between operative and inoperative positions, and means for moving said light dimmer between said operative and inoperative positions in synchronism with the operation of said shutter and with a phase displacement relative thereto and to maintain said light dimmer at a standstill in said operative position, said light dimmer being arranged when in said operative position to reduce the luminous flux falling on said photoelectric cell to the average value of the luminous flux which falls on said cell during the operation of said shutter.

2. A motion picture camera as set forth in claim 1, in which said photoelectric cell is a photoconductor.

3. A motion picture camera as set forth in claim 1, in which said light dimmer comprises a diaphragm.

4. A motion picture camera as set forth in claim 1, in which said light dimmer comprises a filter.

5. A motion picture camera as set forth in claim 1, in which said means for moving said light dimmer are operatively connected to said pull-down mechanism.

6. A motion picture camera as set forth in claim 5, in which said pull-down mechanism comprises a pull-down claw engageable with said film and said light dimmer is rigidly secured to said pull-down claw.

7. A motion picture camera as set forth in claim 5, in which said pull-down mechanism comprises a rotary shaft and said means for moving said light dimmer is operatively connected to said shaft.

8. In a motion picture camera as set forth in claim 1, a light dimmer pivotally mounted on said shutter and driven by said pull-down mechanism.

9. In a motion picture camera as set forth in claim 8, said light dimmer comprises a diaphragm.

10. In a motion picture camera as set forth in claim 8, said light dimmer comprises a filter.

11. In a motion picture camera as set forth in claim 8, the light dimmer only partially immerses into the path of rays at a standstill of the shutter, an eccentric disk arranged on said shutter, said light dimmer being pivotally mounted on said eccentric disk, the depth of immersion of said dimmer into the path of rays being adjustable by turning said eccentric disk.

References Cited

UNITED STATES PATENTS

| | | | |
|---|---|---|---|
| 3,057,251 | 10/1962 | Mahn | 352—141 |
| 3,188,935 | 6/1965 | Lieser et al. | 352—141 XR |
| 3,208,078 | 9/1965 | Koeber | 352—141 |
| 3,248,166 | 4/1966 | Reinsch | 352—141 |

FOREIGN PATENTS 381,980  11/1964  Switzerland.

NORTON ANSHER, *Primary Examiner.*

J. F. PETERS, JR., *Assistant Examiner.*

U.S. Cl. X.R.

352—141, 191, 207